J. Carnegy,
Water Wheel,
Nº 3,530.    Patented Apr. 10, 1844.
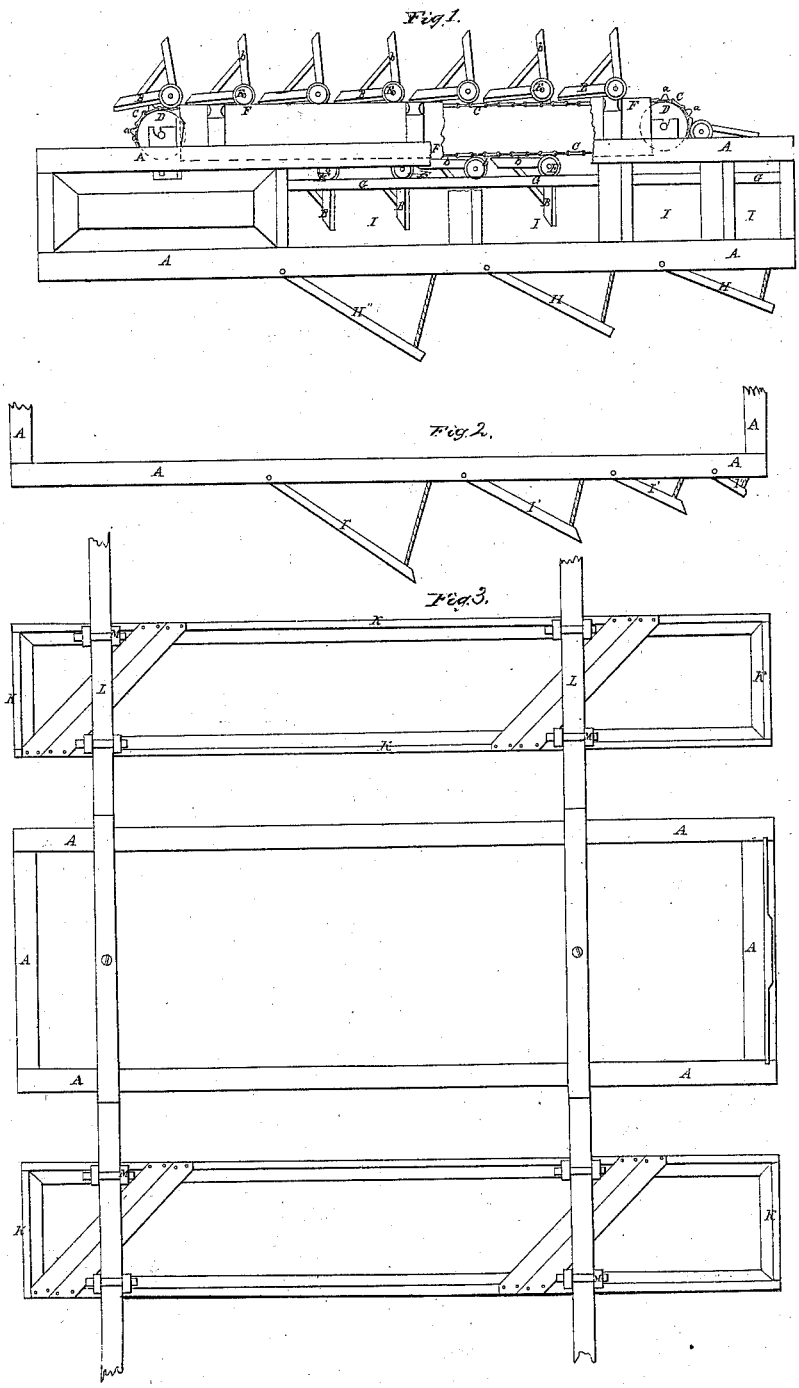

UNITED STATES PATENT OFFICE.

JOHN CARNEGY, OF TULLEY, MISSOURI.

CURRENT WATER-WHEEL.

Specification of Letters Patent No. 3,530, dated April 10, 1844.

*To all whom it may concern:*

Be it known that I, JOHN CARNEGY, of Tulley, in the county of Lewis in the State of Missouri, have made certain new and useful Improvements in the Manner of Constructing Current Water Power Apparatus; and I do hereby declare that the following is a full and exact description thereof.

My apparatus is of that kind in which a number of buckets are affixed to two, or more, endless chains which pass around suitable drums, to which said chains are geared by teeth on said drums, which teeth take into the links of the chains. The buckets are, to be, attached to said chains by hinge joints, so that they may fall over and lie flat upon the chain, as they are carried back on the upper side of it. The cylinder chains and buckets, with their appendages, are to be secured in a proper frame, constituting a part of a hollow trunk, which is to be sustained by two floats, or buoys, in such manner as that the whole apparatus shall rise and fall with the rise and fall of the current in which it is placed, in order that the buckets may at all times dip to a proper distance into the water, and be acted upon by its full force. Chains of buckets of this description have been attempted to be used as substitutes for water-wheels; but in these attempts it was found that nearly the whole force of the water was expended on the first bucket on which it impinged, the others consuming by the friction of the parts to which they are attached, nearly as much power as they communicate. To remedy this fault, and render the apparatus more efficient than it has heretofore proved to be, I affix wing-gates on each side of the hollow trunk that contains the revolving buckets; and I also affix similar wing-gates on the bottom of said trunk; these wing-gates being so arranged as to cause them successively to collect a portion of the water, that would otherwise pass along on the sides and under the trunk, to enter it, and to operate on the rear buckets, which without this device would be a burden rather than a benefit to the machine; in most cases, and probably in all, three such gates on each side, and the same number on the bottom of the trunk, will be as many as will be found useful. They are to be made to extend, as they succeed each other, to a greater distance from the trunk into the water.

In the accompanying drawing, Figure 1, is a side view of the trunk within which the buckets revolve. Fig. 2, is a top view of the timber which forms one side of the frame work of the trunk. Fig. 3, is a top view of the frame of the trunk, and of the two floats between which it is to be sustained.

A, A, is the frame of the hollow trunk.

B, B, are buckets which are attached to two, or more, chains, C, C, that pass around cylinders, D, D; which cylinders have projecting teeth, a, a, upon them that engage with the links of the chain, causing the cylinders to be thereby carried around. The power is to be communicated from one, or more, of the gudgeons of the cylinders, D, D, to the machinery that is to be driven, which may be done by toothed gearing, or otherwise.

On the two ends of each of the buckets, on that edge of it which is jointed to the chain, there is a friction wheel, or roller, E, E, that runs upon ways, F, F, and G, G; the former sustaining the buckets when out of the water, and the latter sustaining them within it; the lower edge, F', of the side piece F, stands at such distance from the rail, G, G, as to check the wheels, or rollers, E, E, and prevent their rising.

b, b, are pieces of timber, which stand at right angles to the buckets, B, B, and c, c, are braces which sustain them; the ends of the timbers, b, b, extend out so as to come nearly into contact with the next succeeding bucket, as at b'; by thus bearing on the link of the chain that is attached to the bucket by a hinge joint, it is effectually kept from rising by the force of the water, and thus throwing the bucket out of the vertical line; they are, consequently, sustained in their proper position as they pass through the trunk.

H, H, H, are wing-gates placed below the trunk, and forming a part of its bottom; these dip successively lower and lower into the water, and thus serve more effectually to force successive portions of it into the trunk and against the buckets. These wing-gates may be raised, or lowered, at pleasure. I, I, I, are openings which are to receive similar wing-gates on each side of the trunk.

I', I', Fig. 2, show the wing-gates open; A, A, in this figure being the upper side of the frame. These, like the lower gates, may be opened or closed to any desired extent, by means of check ropes, or chains.

In Fig. 3, I have represented only the upper edge of the frame work of the trunk, and of the two floats by which it is to be supported. A, A, is the upper edge of the trunk, and K, K, the upper edge of the two floats, which may be made like scows; but they should be roofed, or decked over, to keep out water which might otherwise enter them from the descent of snow, or rain, or from other causes. The width and depth of these floats, must, of course, be governed by circumstances in each individual case; as, for example, by the size of the apparatus, the depth of water, and the peculiarities of its particular location. L, L, are timbers extending from one of the floats to the other. These are to stand at such height above the floats as to enable them to pass over the trunk, A, A, which is to be suspended from them. The timbers, L, L, should be made to slide end-wise through the upper ends of the stanchions M, M, that rise from the floats, so that their distance from the trunk may be regulated. When, in winter, or from any consideration, it may be necessary to remove the apparatus into a cove, or other place of security, the floats may be moved into contact with the trunk.

To prevent injury to the works from floating timber, or ice, suitable fenders, or gratings, may be erected, or moored, in such manner as the peculiarities of the case may require, or the judgment of the millwright dictate. In all these particulars, the business is to be managed according to known principles.

The manner in which I connect my buckets to the endless chains by hinge joints, causes them to enter and leave the water without resistance, as they are enabled thereby to accommodate themselves to its force in their change of position.

Having thus, fully described the nature of my invention, and shown the manner in which the same is carried into operation, what I claim therein as new, and desire to secure by Letters Patent, is—

The employment of a series of buckets which are connected by hinge joints to two, or more, endless chains, in the manner herein set forth; the shafts of which buckets are furnished with friction wheels, or rollers, that run between ways below and above them, and have stop pieces, such as are shown at b, b, that extend back so as to come into contact with a link of the chain in the immediate vicinity of the next succeeding bucket, in the manner, and for the purpose, above fully made known, which endless chains of buckets, so arranged, I intend to combine with a floating trunk furnished with wing gates, and otherwise constructed as herein described.

JOHN CARNEGY.

Witnesses:
 THOS. P. JONES,
 EDWIN L. BRUNDAGE.